United States Patent
Doherty et al.

(10) Patent No.: US 10,458,073 B2
(45) Date of Patent: Oct. 29, 2019

(54) SUSPENDED LAYERED ENERGY ABSORBING MATERIAL FOR VEHICLE ARRESTING SYSTEMS

(71) Applicant: Engineered Arresting Systems Corporation, Aston, PA (US)

(72) Inventors: Shawn P. Doherty, Hockessin, DE (US); Nicholas M. Flynn, Cherry Hill, NJ (US); Yijian Shi, Logan Township, NJ (US); Sarah Ma, Sunnyvale, CA (US); Hong Zou, Chadds Ford, PA (US)

(73) Assignee: Engineered Arresting Systems Corporation, Aston, PA (US)

( * ) Notice: Subject to any disclaimer, the term of this patent is extended or adjusted under 35 U.S.C. 154(b) by 0 days.

(21) Appl. No.: 15/157,826

(22) Filed: May 18, 2016

(65) Prior Publication Data

US 2016/0340838 A1    Nov. 24, 2016

Related U.S. Application Data

(60) Provisional application No. 62/163,180, filed on May 18, 2015.

(51) Int. Cl.
*E01C 9/00* (2006.01)
*B64F 1/02* (2006.01)
*E01C 19/00* (2006.01)

(52) U.S. Cl.
CPC .............. *E01C 9/007* (2013.01); *B64F 1/025* (2013.01); *E01C 19/00* (2013.01)

(58) Field of Classification Search
CPC ........... B64F 1/025; E01C 3/003; E01C 9/007

USPC .......................................................... 404/31
See application file for complete search history.

(56) References Cited

U.S. PATENT DOCUMENTS

| 3,066,896 | A | * | 12/1962 | Schirtzinger | B64F 1/02 188/298 |
| 3,659,812 | A | * | 5/1972 | Carlsson | E01C 9/007 244/114 R |
| 3,967,704 | A | | 7/1976 | Ogden | |
| 5,193,764 | A | * | 3/1993 | Larratt | B64F 1/025 188/377 |
| 5,885,025 | A | * | 3/1999 | Angley | B64F 1/025 188/377 |

(Continued)

FOREIGN PATENT DOCUMENTS

| CN | 201924251 | 8/2011 |
| GB | 1449824 | 9/1976 |

OTHER PUBLICATIONS

PCT/US2016/033037, Search Report and Written Opinion dated Jul. 22, 2016.

*Primary Examiner* — Gary S Hartmann
(74) *Attorney, Agent, or Firm* — Kilpatrick Townsend & Stockton LLP; Dean W. Russell; Kristin M. Crall (57) ABSTRACT

Systems and methods for arresting aircraft. In specific embodiments, the systems and methods can be useful in arresting light aircraft because they typically do not have the weight to penetrate available EMAS systems. The system is generally provided as a structure having a suspended layer of energy absorbing material. A lower portion of the system can have a lower strength, used as a method to suspend an upper, stronger/more highly energy absorbent portion of the system.

12 Claims, 5 Drawing Sheets

(56) References Cited

U.S. PATENT DOCUMENTS

| | | | | |
|---|---|---|---|---|
| 5,902,068 | A * | 5/1999 | Angley | E01C 9/007 |
| | | | | 249/2 |
| 6,174,587 | B1 * | 1/2001 | Figge, Sr. | B32B 5/18 |
| | | | | 181/290 |
| 6,685,387 | B2 | 2/2004 | Allen et al. | |
| 6,726,400 | B1 | 4/2004 | Angley et al. | |
| 6,971,817 | B2 | 12/2005 | Allen et al. | |
| 7,261,490 | B2 | 8/2007 | Allen et al. | |
| 7,371,029 | B2 * | 5/2008 | Rogers | E01F 13/126 |
| | | | | 404/10 |
| 7,467,909 | B2 | 12/2008 | Orner, Jr. et al. | |
| 7,597,502 | B2 | 10/2009 | Allen et al. | |
| 7,744,303 | B2 * | 6/2010 | Rastegar | E01F 13/123 |
| | | | | 188/377 |
| 7,905,678 | B2 * | 3/2011 | Rastegar | B64F 1/025 |
| | | | | 188/371 |
| 8,007,198 | B1 | 8/2011 | La Valley et al. | |
| 8,579,542 | B2 * | 11/2013 | Narmo | C04B 14/24 |
| | | | | 188/376 |
| 9,382,671 | B2 * | 7/2016 | Ungerleider | C04B 28/04 |
| 10,196,156 | B2 * | 2/2019 | Valentini | B64F 1/025 |
| 2013/0020437 | A1 * | 1/2013 | Valentini | B64F 1/025 |
| | | | | 244/110 R |
| 2015/0247298 | A1 * | 9/2015 | Li | E01C 9/007 |
| | | | | 428/116 |

\* cited by examiner

Block with Varying-sized Voids

SUSPENDED LAYERED ENERGY ABSORBING MATERIAL FOR VEHICLE ARRESTING SYSTEMS

CROSS REFERENCE TO RELATED APPLICATIONS

This application claims the benefit of U.S. Provisional Application Ser. No. 62/163,180, filed May 18, 2015, titled "Composite Layered Energy Absorbing Material for Vehicle Arresting Systems," the entire contents of which are hereby incorporated by reference.

FIELD OF THE DISCLOSURE

Embodiments of the present disclosure relate generally to vehicle arresting systems that are designed for installation at the end of a runway or other surface that is subject to potential vehicle overrun. Embodiments find particular use when installed at the end of an aircraft runway and when used to arrest light aircraft.

BACKGROUND

Vehicle arresting systems are used as barriers at the end of runways to decelerate aircraft that overrun the end of the runway. These systems are designed to predictably and reliably crush (or otherwise deform or displace) under the pressure of aircraft wheels. The materials used in such a system are generally compressible, deformable, crushable, or otherwise able to be compressed, deformed, or crushed upon appropriate impact. The materials are generally designed to have a low strength that allows their crushing upon impact. During an arrestment, the wheels of the aircraft crush (or deform) the material. The depth of wheel penetration into the material is dependent on the vertical load applied by the material. The deceleration of the aircraft is dependent on the drag load applied by the material. In most arresting systems, the main core crushable material has isotropic properties which provide a fixed ratio between the wheel penetration and deceleration for each aircraft.

Due to this ratio, traditional arresting systems may not be able to decelerate certain lighter aircraft in the desired or available overrun area. For example, light aircraft may not have enough weight upon impact with the vehicle arresting barrier to cause the wheels of the aircraft to sink deep enough into the barrier material or otherwise crush enough of the barrier for arrestment.

BRIEF SUMMARY

Embodiments of the invention described herein thus provide systems and methods for arresting aircraft. In specific embodiments, the systems and methods can be useful in arresting light aircraft because they typically do not have the weight to penetrate available EMAS systems. However, it should be understood that the discloses systems and methods may work for any type of aircraft or vehicle, including commercial aircraft. The system is generally provided as a structure having a suspended layer of energy absorbing material. A lower portion of the system can have a lower strength/is weaker, which can be used as a method to suspend an upper, stronger/more highly energy absorbent portion of the system. This results in less vertical resistance to penetration while still providing a large(er) force in the horizontal plane (drag load).

In one example, there is provided a vehicle arresting system layered structure that has at least one suspended upper portion of energy absorbing material having a first strength, and a lower base portion comprising a material of a second, lower strength than the material of a first strength. The lower base portion can be a layer of a more easily crushable material than the upper suspended portion. In some examples, the suspended upper portion comprises deformable material. In other examples, the suspended upper portion comprises crushable material.

There may be provided additional portions of material that decrease in energy absorbing capabilities moving from the upper portion to the lower portion. The suspended upper portion and the lower base portion comprise gradients within the structure. Furthermore, the gradients can extend between the suspended upper portion and the lower base portion and further extend between a foremost portion and a rearmost portion.

In other examples, the lower base portion includes one or more columns of the material of a lower strength with one more voids therebetween. The material of a lower strength of the lower base portion can comprise one or more voids.

In use, there is provided a method for arresting an aircraft, comprising, installing a vehicle arresting system having any of the above features at an end of a runway or other overrun area. Specific examples may be installed at an airport or on a runway that is accessed by lightweight aircraft.

DETAILED DESCRIPTION

Embodiments of the present invention provide a suspended layer of energy absorbing material used for vehicle arresting systems. The composite material is particularly designed for arresting light aircraft in an overrun event. As used herein, "light aircraft" generally means aircraft that are lighter than traditional wide-body or twin-aisle aircraft used for long haul flights. The term "light aircraft" includes but is not limited to business jets, microjets, cessnas, regional airliners, commuter aircraft, short-haul aircraft, or civil aviation aircraft. Light aircraft are generally lighter than traditional commercial passenger aircraft.

In a overrun situation, the wheels of an aircraft may not have a load that can penetrate a traditional arresting system in the vertical load direction in the way that the heavy load of a larger aircraft would. Wheels of light aircraft may not sink deep enough in a traditional vehicle arresting barrier system. Additionally, effective arresting of an overrun light aircraft may benefit from a shallow arresting system, which can help avoid propeller strikes.

Accordingly, the suspended layer of energy absorbent material described herein is designed to provide additional drag load in the horizontal direction. The general intent is to accommodate/apply a larger horizontal component of force in the arresting process, while eliminating some of the required vertical load required for crushing of the barrier material. The result is that wheels of a light aircraft are allowed to sink deeper into the lower layer of the arresting system, but an appropriate drag load is still provided by the upper layer.

The inventors have thus provided an arresting system that has the ability to vary the drag and vertical load of the system. This can allow for better arresting in a shorter overrun distance. This can also allow for using the same area to arrest vehicles overrunning the runway at higher speeds (e.g., current engineered materials arresting systems (EMAS) are designed for exit speeds up to 70 knots).

The improved system 10 is generally provided with a suspended layer, resulting in more than one layer of varied material strength. A lower base portion of the system generally has a lower strength/is weaker than an upper portion of the system. By providing a lower strength material at the lower portion of the system, there is less vertical resistance to penetration. The practical effect of this design is that vehicle wheels, upon penetration of the upper/stronger portion, penetrate/crush/can be stopped by the drag load applied by the upper portion. A schematic of this effect is provided by FIG. 9B, described in more detail below. As shown in this and other figures, because of the low strength lower portion, the amount of wheel penetration is such that application of the drag load from the upper layer (illustrated by horizontal arrows 80) can be in line with the aircraft axle. Only the upper layer(s) apply/applies the drag load in line with the aircraft axel. The lower base layer is simply present in order to suspend the upper layer; it is not intended to add any strength/drag load to the system.

Other EMAS systems that have experimented with different strengths of materials have provided the denser/stronger material at the bottom and a lighter/weaker material as the upper/top layer. The general theory behind such systems is that they must be capable of stopping large, heavy aircraft and need to have the majority of the system made of the high-strength material. However, the wheels of light aircraft do not always penetrate deep enough into the denser/stronger material at the bottom. The present inventors thus sought to provide a system that is capable of stopping light aircraft of lower weight up to large commercial aircraft within a shorter EMAS bed. The prior art systems of providing lighter material on top have only allowed lightweight aircraft to penetrate the top layer, but not penetrate deeply enough into the high-strength lower layer. The system described herein, with a lower layer suspending an upper layer of higher strength/higher energy absorbent characteristics, allows for the wheel of an aircraft to penetrate the EMAS system with the vertical load typically required by a lower strength material but still providing the drag load of a higher strength material.

In general, the vehicle arresting systems described herein provide at least one suspended upper portion/layer of a compressible material that is supported by a lower base portion or area. The lower base layer or portion of material generally has lower energy absorption characteristics than the suspended layer. In other words, the suspended layer is a more highly energy absorbent material that is suspended by a lower material of a lesser or lower energy absorption capability than the layer directly above or vertically adjacent thereto. The vehicle arresting system may be an elevated panel or plane of compressible material, with the compressible material having a plurality of layers with energy absorption capabilities that decrease relative to the panel or layer directly above said panel (when moving down the vertical axis from the upper to lower most layer).

Figure 5:
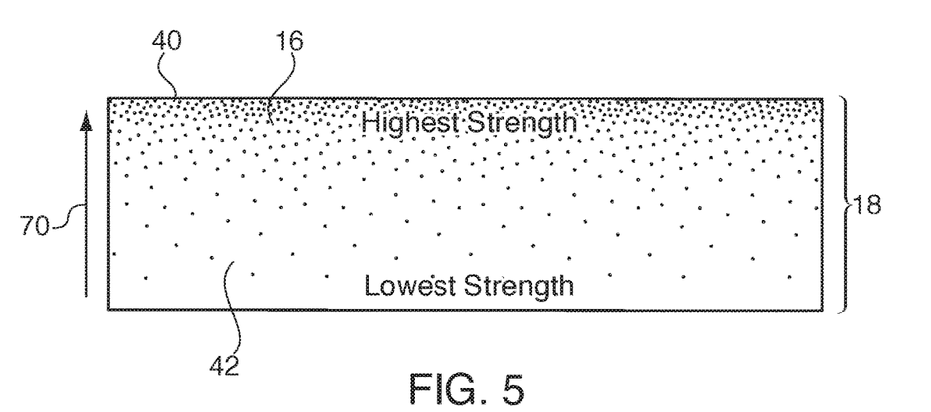
FIG. 5 shows a schematic of a structure having a gradient of strength therethrough.
Figure 6:
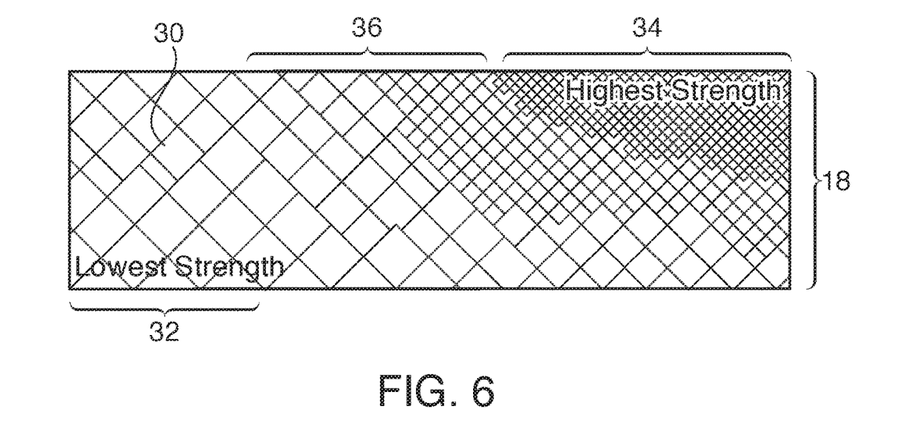
FIG. 6 shows a schematic of a structure having further gradients of material strengths.
Figure 7:
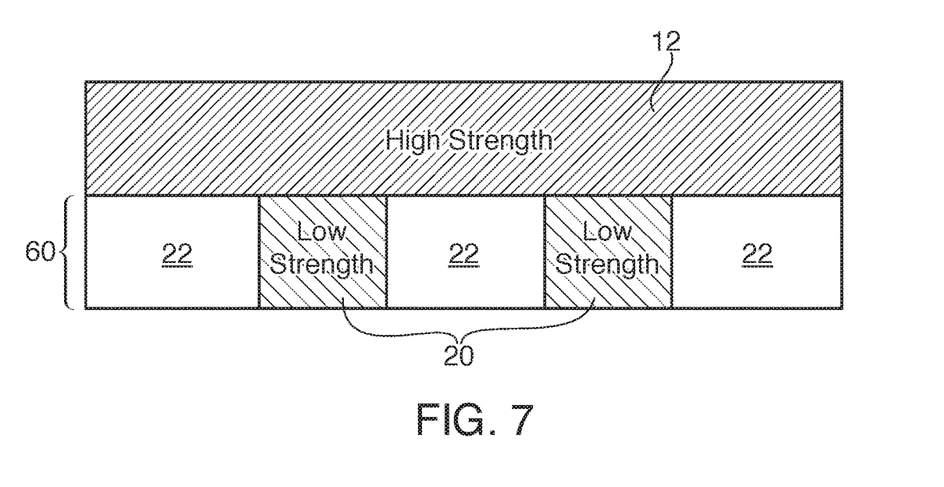
FIG. 7 shows a schematic illustrating an upper layer of high-strength material and lower layer made of a combination of low strength material and voids.
Figure 8:
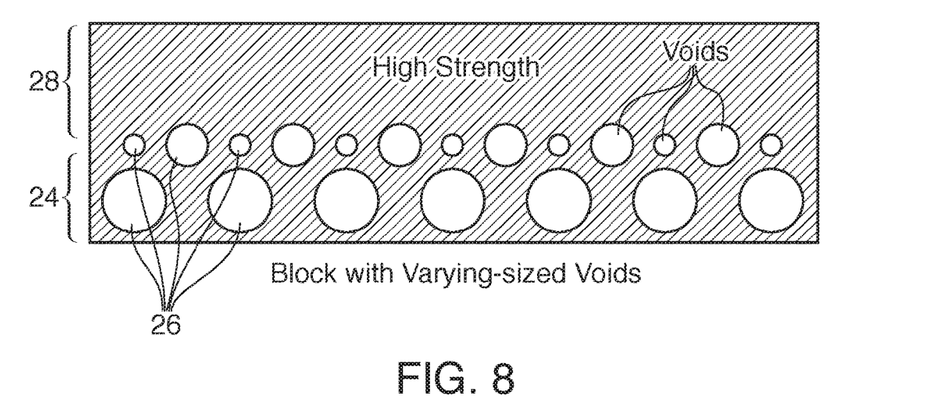
FIG. 8 shows a schematic illustrating a lower portion material having voids therein.

In one example, the system 10 provides two or more horizontal layers 12, 14 of crushable (or deformable) material. The upper suspended layer 12 is designed as having a higher strength than the lower base layer 14. The layers may be horizontal panels of crushable (or deformable) material(s). Multiple layers are illustrated by FIGS. 1-4. In other examples, the system 10 may provide a gradient 16 of strengths formed within a single structure 18 of material. The structure 18 may be a block, a gradient system, or any other appropriate compilation of material. Various types of gradients are possible within the material, as described in more detail below. Gradients are illustrated by FIGS. 5-6. In another example, the system 10 may provide a higher strength upper suspended layer 12 with support columns 20 forming the lower base layer, having voids 22 positioned therebetween. An example of this embodiment is shown by FIG. 7. In a further example, a lower portion 24 of the material may be provided with varying sized voids 26, rendering the material at the lower portion 24 weaker than the material at the upper portion 28. An example of this is illustrated by FIG. 8. All of these options are described in more detail below. Any of the materials described herein may be used for any of the layers, gradients, or portions. The layers, gradient, or portions of the material may all be referred to as a "layered structure," even if distinct and separate layers are not specifically provided.

Each of these layers, gradients, or portions of the layered structure material is designed for the arresting performance of the system, but they may provide protection in addition to arresting performance. For example, a stronger more dense upper layer may permit vehicles/personnel to traverse the EMAS system, whereas if the system was made of only of the lower strength material, such travel would not be possible.

Examples of materials that may be used for any of the layers, portions, or gradients described herein include but are not limited to cellular cement, cellular cementitious material, polymeric foam, honeycomb, metal honeycomb, macro particles, vermiculite, perlite, ceramics, foam glass and other isotropic or anisotropic crushable/deformable materials, or combinations thereof. Each material can have different mechanical and physical properties and geometry. Each material can be selected to tune the desired properties of the overall structure.

One specific example of materials forming the layered structures may be a combination of a polymeric foam forming the lower layer and a metallic honeycomb forming the upper layer. The polymeric foam may have its density/strength varied based on foam formation methods. In another specific example, a low strength honeycomb layer may support a layer of cellular cement or polymeric foam. In a further example, a low strength/density polymeric foam may be used to support an upper layer of cellular cement. Other combinations of materials and strengths are possible and considered within the scope of this disclosure.

The materials may be selected to provide the desired strength ratios. In one example, a drag to vertical load ratio may reach 1:1. It may be possible to get the ratio even higher than 1:1, and higher drag to vertical loads are desirable. For example, the ratio may be 2:1, 5:1, or 10:1. The general goal is that for every pound of drag, there be a equal or smaller amount of vertical load required to penetrate into the system. It is desirable that the resistance of the aircraft wheel required to travel through the high strength material in the vertical direction be minimized, and that horizontal resistance (drag) being applied to the wheel be great.

Figure 1:
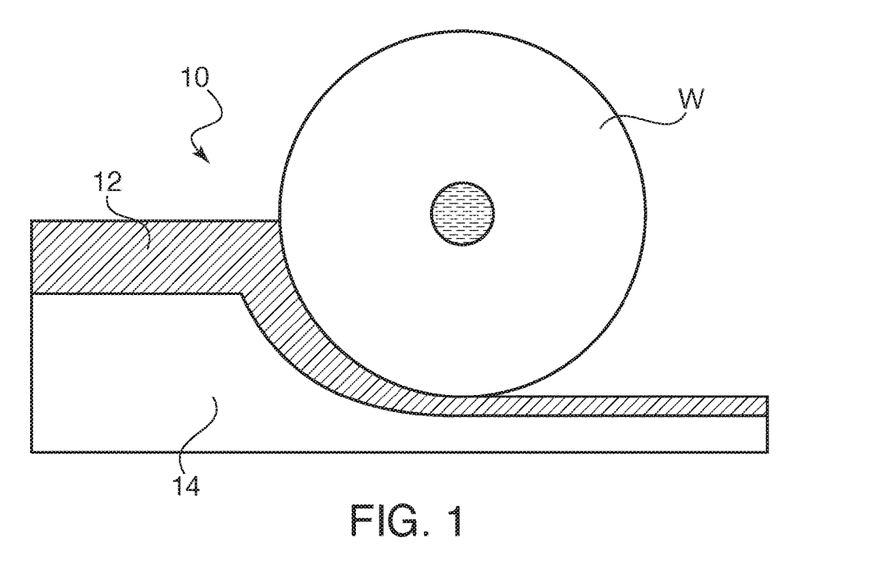
FIG. 1 shows a schematic view of an aircraft wheel deforming a layered structure arresting system.
Figure 2:
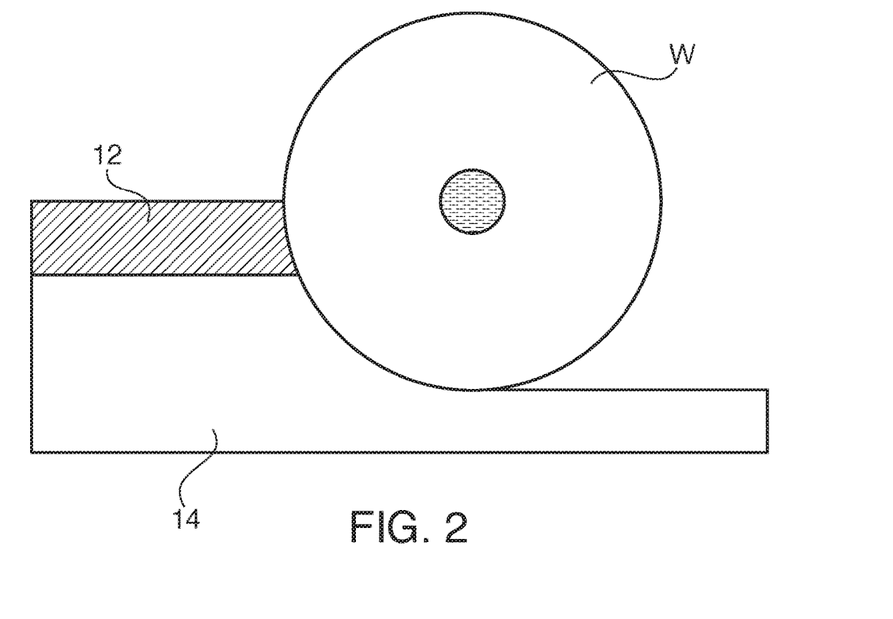
FIG. 2 shows a schematic view of an aircraft wheel crushing a layered structure arresting system.

The layered structure may be comprised of different materials. For example, FIGS. 1 and 2 show a lower layer 14 of weaker material positioned under an upper layer 12 of a higher strength material. The material itself may be the same material with different physical/mechanical properties. Alternatively, different types of material may be provided to form each layer 12, 14. In FIG. 1, the upper layer 12 is a deformable, strong material. The lower layer 14 is weaker, crushable material. In this example, the lower portion is thicker (or otherwise forms more of the bulk of the system) than the upper portion.

The system (both upper and lower layers) may be coated in a coating, film or shell, collectively referred to as a "shell." This shell can be provided to protect the core energy absorbing material from the effects of weathering/jet blast. The shell may be designed to shear and/or tear, allowing the wheel to penetrate into the core material. The shell may be elastic in nature, allowing it to deform and elongate (but not tear or shear) such that it deforms enough to allow the wheel to crush/deform the core material. The core can be crushed and pressed and moved upon pressure, and the shell can elongate and deform to allow the wheel to move through the material, while containing the upper and lower layers, and preventing them from fracturing into pieces. In another example, the upper layer 12 may function like an elastic coating. For example, it may be an elastic sprayable polymer. The upper layer 12 can deform upon touch but does not lose its integrity. The lower layer 14, however, can be caused to crush or otherwise deform beneath the upper layer 12. In use, the wheel "W" penetrates the lower layer 14 without actually contacting the lower layer directly. The coating 12 in this example functions to contain the core of the lower/upper layers 14.

In FIG. 2, the upper layer 12 is a layer of a strong, crushable material and the lower layer 14 is a layer of a weaker, crushable material. These materials may be the same materials, modified separately as described below in order to alter their respective strengths. Alternatively, these materials may be completely different materials having different strengths that are layered upon one another. As illustrated, the aircraft wheels W are allowed to crush both layers 12, 14 during contact and the arrestment process.

For example, if the material used is polymeric foam, it is possible to alter the density/strength of the foam. This may done by varying cell alignment for different portions of the structure. In another example, this may be done by injecting voids into the foam in the form of air bubbles in order to weaken the lower portion areas of the foam.

Additionally or alternatively, one or more chunks of lighter material may be mixed into the foam or other material that forms the lower portion of the system. Additionally or alternatively, particle sizes of various materials used may be varied to change densities of the players/portions.

Figure 3:
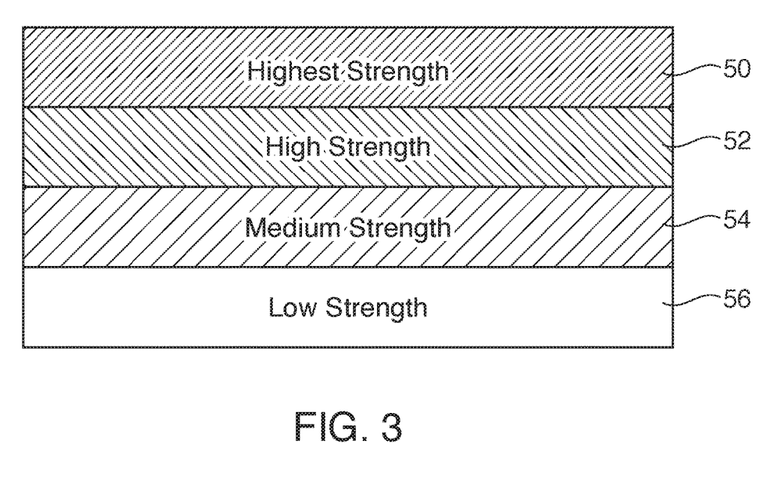
FIG. 3 shows a schematic illustrating layers of high to low strength materials.

FIG. 3 illustrates a structure comprised of multiple layers, each with differing energy absorption characteristics. Each layer, plane or zone has a specified strength that generally differs from one or more layers, planes or zones thereabove. The upper most layer 50 has the highest strength, with the layers therebelow decreasing in strength. For example, the next layer 52 has a high strength (as compared to layer 50). The next layer 54 has a medium strength (again, comparatively). The next layer, the lowermost layer 56, has a comparatively low strength. Although an example with four layers is shown, it should be understood that more or fewer layers may be provided. It is also possible that the layer strengths need not vary greatly or substantially with respect one another. Small strength steps are possible and considered within the scope of this disclosure.

Additionally, an alternate example may be a high/low/high/low embodiment. In this example, the upper most layer may have a high strength, the next layer may have a low strength, the next layer down may have a high strength, and the lowermost layer may have a low strength. The general concept is providing alternating of layer strengths.

In any of the layer examples, it is possible for the layers to be bonded or adhered to one another using any appropriate EMAS technique. Adhesive or high friction are examples only. In another example, it is possible for the layers to be stepped or laid on top of one another. In any option, the layers may then be contained by a separate containment system. Exemplary containment systems are shown and described by many of the present assignee's pending applications and issued patents. Alternatively, the containment system could be a sprayable covering, a flame-resistant coating, a weather-resistant coating or any other appropriate outer layer. These securement/containment system options may be used in any of the examples described herein.

Figure 4:
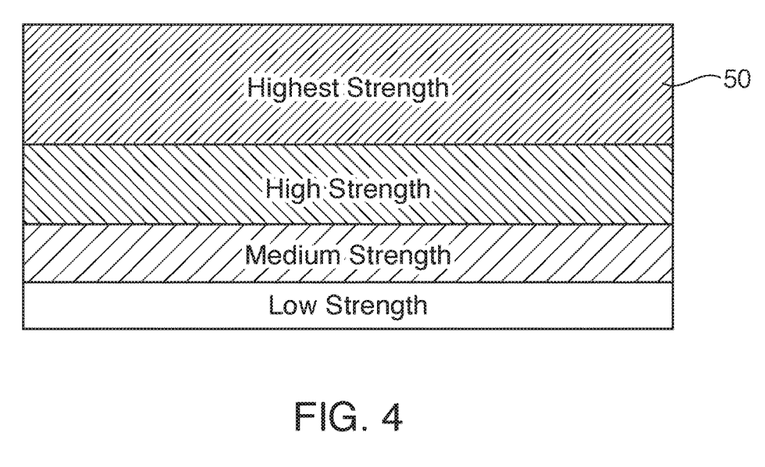
FIG. 4 shows a schematic illustrating an alternate embodiment of layers of high to low strength materials.

FIG. 4 illustrates an alternate embodiment in which the specified strength layers have varying heights. In the example shown, the uppermost, highest strength layer 50 is shown as thicker than the lower layers. Alternatively, it is possible for the uppermost, highest strength layer 50 to be thinner than the lower layers, such that the high, medium, and/or low strength materials provide a larger portion of the barrier material.

FIG. 5 illustrates a gradient material 16 formed as a structure 18. As discussed above, the structure may be a block, a gradient system, or any other appropriate compilation of materials. Rather than having two or more separate layers bonded, this embodiment provides a single structure 18 that has an increasing density moving upwards from the bottom towards the top face 40 of the structure or block, and the direction of arrow 70. Considered a different way, there is a decreasing density moving down through the structure or block, from the top towards the bottom face 42. The gradient of energy absorbing ability decreases from the upper most plane to the lower most plane. This gradient of energy absorbing ability may be provided by any of the above-described modifications to a material. It may be referred to as a top-to-bottom gradient.

FIG. 6 illustrates a gradient material 30 formed as a structure 18. As discussed above, the structure may be a block, a gradient system, or any other appropriate compilation of materials. In this example, sections of material are oriented to have a gradient of energy absorbing capabilities that increases from lower most to uppermost, as well as from foremost to rear most of the system. More specifically, a lower strength material is provided at a front portion 32 of the structure. A higher strength material is provided at a rear portion 34 of the structure. The material therebetween 36 is generally formed as a gradient of gradually increasing strength. The gradually increasing strength of this section moves from a lower portion of the structure to an upper portion of the structure, as well as from a front portion to a rear portion. This example provides an energy absorbent material with the internal energy absorbing characteristics varying from the lowest point to the uppermost point and varying from the frontmost point to the rearmost point.

Although shown as a gradient, it is also possible to provide this effect using various structures, blocks, or layers. For example, the frontmost portion, structure or block may be provided having a lower energy absorption ability (i.e., a weaker strength) and rear most and higher portions, structures, or blocks may be provided having a higher energy absorption ability (i.e., a stronger strength).

FIG. 7 illustrates an embodiment having an upper layer 12 of a high strength and a lower portion 60 that is formed of support columns 20 of low strength material with voids 22 interspersed therebetween. The voids 22 may be actual openings in which no material is present. In other examples, the voids 22 may be formed of material having an even lower strength than the low strength support columns 20. The result is that a highly energy absorbent material forms the uppermost layer and is supported by columns of lower energy absorbent material with voids between the columns.

FIG. 8 illustrates a schematic of a configuration in which the lower portion 24 is made to have lower energy absorption abilities through the introduction of voids 26. The voids 26 are illustrated as having varying sizes and shapes. It should be understood however that the voids may all be similarly sized and shaped. The voids may be formed using any of the above-described methods or materials. Additionally, although the voids are shown as circular, it should be understood that the shapes would greatly vary depending upon the way that the voids are formed. The general effect of voids 26 is that the lower portion 24 of the material has a lower energy absorption capability.

Figure 9A:
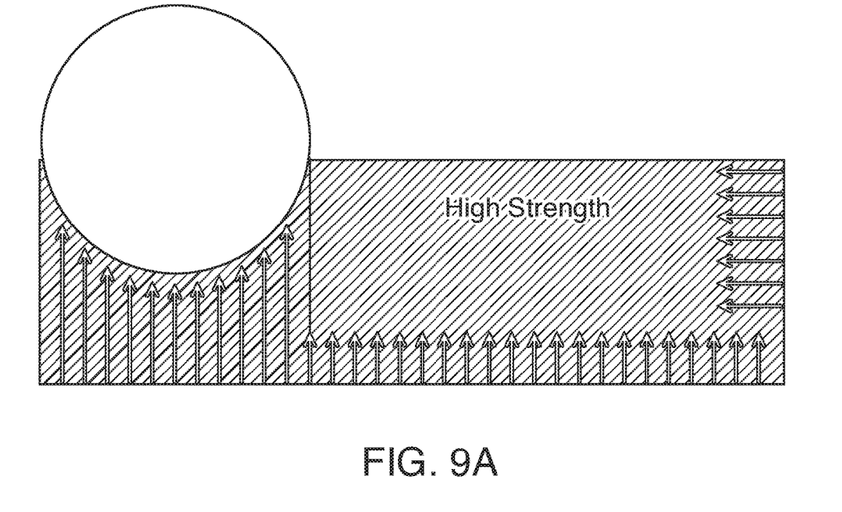
FIG. 9A shows a schematic of an example of a typical EMAS high-strength material.
Figure 9B:
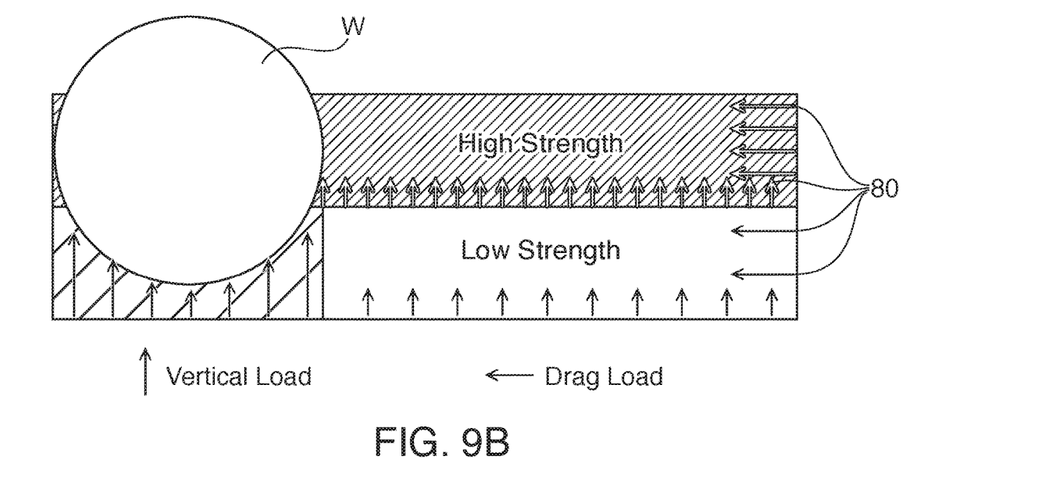
FIG. 9B shows a schematic of a layered structure and loads applied in use.

This performance of the systems described herein is different than traditional EMAS systems, which have isotropic material and system properties. A traditional EMAS system is illustrated by FIG. 9A. This example is entirely a single strength material. By contrast, the suspended layer structures disclosed can be designed to have a higher ratio of drag load to vertical load. This is illustrated by FIG. 9B. Once the aircraft wheel W has penetrated into the system by deformation, crushing or by other method, the upper layer(s) would provide higher drag load than a typical EMAS system with similar wheel penetration, leading to a more rapid deceleration of the aircraft during an arrestment. One purpose of this system is to be able to provide the drag load of a high strength material, but only require the vertical load of a low strength material to penetrate into it. One benefit provided (vs. a typical EMAS) is that given the same vertical load, the aircraft will be able to penetrate deeper into a suspended layer structure due to the low strength lower layer, but receive the same amount of drag load as if the wheel had penetrated (the same depth) into the higher strength material.

Once the wheel has penetrated into the system by deformation, crushing, or by other method, the upper layer(s) provide a higher drag load than a typical EMAS system would for a similar weight aircraft, leading to a more rapid deceleration of the aircraft during an arrestment.

Some light aircraft have propellers or generally have limited ground clearance below, such that their wheels cannot penetrate certain depths. Accordingly, the structures described herein may be designed having upper and lower layers of various heights, depending upon needs of the particular runway or aircraft to be stopped. One non-limiting example includes 5 to 12 inches of the material forming the barrier. In one specific example, a 7 inch barrier may work with certain aircraft. The barriers described herein may include a ramp up portion, they may be installed directly above ground, and/or they may be installed slightly or greatly below ground.

The varying strength layers allow the aircraft wheels W to penetrate into the system with the force required by a low strength material, but to encounter the drag load that would typically be produced by a higher strength material. The layer structure may be arranged in height and positioning and strength/energy absorption based upon the desired degree of penetration and resulting drag load for a specific size/weight of a specific fleet mix. The drag and vertical loads can be tuned or modified to allow for better arresting in a shorter overrun distance and/or to allow for the same area to arrest vehicles overrunning the runway at higher speeds. Each layer can have different mechanical/physical properties and geometry and will be selected to tune to the desired properties of the overall structure.

Changes and modifications, additions and deletions may be made to the structures and methods recited above and shown in the drawings without departing from the scope or spirit of the disclosure or the following claims.

What is claimed is:

1. A vehicle arresting system layered structure, comprising:
    at least one suspended upper portion of crushable energy absorbing material having a thickness and a first strength; and
    at least one lower base portion comprising a crushable energy absorbing material having a thickness and a second, lower strength than the material having a first strength such that the lower base portion is more easily crushable than the upper portion; and
    a weather-protective coating, film, shell, or combination thereof covering at least part of the upper portion of the vehicle arresting system layered structure.

2. The structure of claim 1, wherein the thickness of the lower base portion is thicker than the thickness of the upper portion.

3. The structure of claim 1, wherein the thickness of the lower base portion is not as thick as the thickness of the upper portion.

4. The structure of claim 1, further comprising additional portions of material that decrease in energy absorbing capabilities moving from the upper portion to the lower portion.

5. The structure of claim 1, wherein the suspended upper portion and the lower base portion comprise gradients within a single structure.

6. The structure of claim 5, wherein the gradients extend between the suspended upper portion and the lower base portion and further extend between a foremost portion and a rearmost portion.

7. The structure of claim 1, wherein the lower base portion comprises one or more columns of the material of a lower strength and one or more voids therebetween.

8. The structure of claim 1, wherein the material of a lower strength of the lower base portion comprises one or more voids.

9. The structure of claim 1, wherein the weather-protective coating, film, shell, or combination thereof comprises a protective shell around the structure.

10. A method for arresting an aircraft, comprising,
    installing the vehicle arresting system of claim 1 at an end of a runway or other overrun area.

11. The method of claim 10, wherein the vehicle arresting system is installed at an airport or on a runway that is accessed by lightweight aircraft.

12. A vehicle arresting system layered structure, comprising:
- an upper portion of crushable energy absorbing material having a first strength; and
- a lower base portion comprising a crushable energy absorbing material having a second, lower strength than the material having a first strength, such that the lower base portion is more easily crushable than the upper portion; and
- a weather-protective coating, film, shell, or combination thereof covering at least part of the upper portion of the vehicle arresting system layered structure,
- wherein the layered structure comprises a single structure with varied strength gradients therein forming the upper portion and lower base portion.

* * * * *